Patented May 13, 1947

2,420,496

UNITED STATES PATENT OFFICE 2,420,496

RECOVERY OF PRODUCTS FROM ALDEHYDE CONDENSATIONS

Herman A. Poitras, Teaneck, John E. Snow, Hasbrouck Heights, and Sylvio A. De Lorenzo, Clifton, N. J., assignors to Heyden Chemical Corporation, New York, N. Y., a corporation of Delaware No Drawing. Application December 2, 1943, Serial No. 512,604

7 Claims. (Cl. 260—637)

This invention relates to a new process for the recovery of useful products from aldehyde condensations made in an alkaline medium, and relates more particularly to processes in which trimethylolethane, trimethylolpropane and other formaldehyde-aldehyde and formaldehyde-ketone condensation products are recovered.

Trimethylolethane, trimethylolpropane, 2,2-dimethylolpropane and higher polymethylolalkanes may be made by condensing one mol of an aliphatic aldehyde such as propionaldehyde, n-butyraldehyde, isobutyraldehyde, or higher aliphatic aldehydes, respectively, with three to three and one-half mols of aqueous formaldehyde in the presence of lime or sodium hydroxide.

Proposed processes for the preparation of trimethylolethane and trimethylolpropane all suggest the impossibility of removal of any of the desired products by a crystallization process. Various means have been suggested, such as steam distillation and extraction. Our new process makes it possible to remove the bulk of the metal formate salts, thereby making further processing possible, particularly the removal of the remaining salts by treatment with an ion-exchange resin, as disclosed in application Serial No. 484,242, filed April 23, 1943, by Karl A. Fisher and Harry Burrell. In that process a diluted aqueous solution of the polyhydric alcohol is passed slowly first through a bed of cation-exchange resin and then through a bed of anion-exchange resin, which combined process serves to remove the last traces of electrolyte.

It is an object of the present invention to provide a process for the recovery of trimethylolethane, trimethylolpropane and similar polymethylolalkanes from the products of the reactions of formaldehyde with propionaldehyde and higher aldehydes and ketones. Further objects and advantages of the invention will be apparent to those skilled in the art to which the invention pertains.

The present process involves the discovery that the products polymethylolalkanes above referred to are soluble in certain alcohols, and that advantageous results may be secured by the use of such alcohols. Syrupy by-products from these condensation reactions are readily soluble in such alcohols.

We have discovered that upon concentration of liquors containing trimethylolethane or trimethylolpropane to about 90 per cent solids content, mixing therewith from 1 to 6 parts of a water-soluble aliphatic alcohol such as ethanol, isopropanol or n-propanol to each part of the concentrate, and heating the mixture to about 75° C. to 90° C., the alcohol will dissolve a large amount of trimethylolethane or trimethylolpropane. It will not dissolve much alkali-metal formate or alkaline-earth metal formate. These metal formate salts may be removed by filtering or settling in a separator of the salt-box type. The aqueous alcohol solution can be dehydrated azeotropically. Trimethylolethane may be crystallized out by chilling, whereas trimethylolpropane which is not readily recoverable by crystallization, may be obtained by evaporation of the alcohol. In either case, the portion remaining dissolved can be recovered by evaporation of the solvent, and then freed from salts by the use of the ion-exchange method described in application Serial No. 484,242.

The following is a more detailed description of the process. The reaction liquors are concentrated in vacuum to remove about 90% of the contained water, and treated with a lower aliphatic alcohol such as ethanol, isopropanol or n-propanol. This mixture is refluxed for about one hour to dissolve the polyhydric alcohol and filtered hot on a heated filter. The metal formate salt present is insoluble in the alcoholic solution and is filtered off. The polyhydric alcohol remains in solution. The resulting filtrate is nearly completely dehydrated either by fractionating off a binary azeotrope consisting of water and the aliphatic alcohol or by the use of a ternary azeotrope consisting of benzene or toluene, the alcohol and water in a suitable apparatus. In the case of trimethylolethane, a portion can be crystallized from this alcoholic solution by chilling and filtering, and the remaining filtrate evaporated to dryness. In the cases of the other polyhydric alcohols the aliphatic alcohol is removed from this dehydrated solution by distillation under reduced pressure, and a light-colored syrup remains which is a mixture of the desired polyhydric alcohol and syrupy by-products.

The process of this invention is not generally applicable to the recovery of pentaerythritol, polypentaerythritols and sodium formate from reaction liquors obtained from the condensation of acetaldehyde and formaldehyde in the presence of alkalies because of the substantial insolubility of pentaerythritol and polypentaerythritols in water-soluble aliphatic alcohols. However, a process having some features in common with the process of the present invention is described in the copending application of John E. Snow, Robert H. Barth and Ralph J. Boesel, Serial No.

511,484, filed November 23, 1943. In the process described in said application, an end liquor which consists of a reaction liquor obtained from the condensation of formaldehyde and acetaldehyde in the presence of an alkaline condensing agent, from which liquor the major proportions of pentaerythritol and polypentaerythritols have been removed but which liquor still contains water, metal formate salts, pentaerythritol and syrupy organic byproducts, is treated so as to separate by crystallization substantial amounts of metal formate salts and pentaerythritol from the syrupy organic byproducts in said end liquor.

The following examples illustrate the process:

*Example I.*—Trimethylolethane was made by adding one mol of propionaldehyde to a mixture of 3½ mols of 30% formaldehyde and 1½ mols of 30% sodium hydroxide solution at 30° C. Three hundred sixty (360) parts of a charge of this trimethylolethane-containing liquor was concentrated by evaporation to 125 parts and the concentrate was then heated to reflux with 750 parts of isopropanol for one-half (½) hour. The sodium formate which remained undissolved was removed by a hot filtration in a heated funnel. It assayed 99.2 per cent and represented 51.5 parts of the original 125 parts of concentrate. The filtrate was dehydrated by removal of the water as a water-benzene-isopropanol ternary azeotrope and after concentrating to one quarter of its original volume, filtering and cooling to 5° C., 46.5 parts of trimethylolethane assaying 98.3 per cent were obtained. Upon evaporation of the filtrate to dryness, 16 parts of syrupy residue was obtained, containing 5.5 per cent sodium formate. This sodium formate may be readily removed by passing the solution before evaporation through first a cation-exchange material, and then through an anion-exchange material, as disclosed in application Serial No. 484,242.

*Example II.*—Trimethylolpropane was made by adding one mol of n-butyraldehyde to a mixture of 3½ mols of 30% formaldehyde and 1½ mols of 30% sodium hydroxide solution.

The reaction liquor from a charge of trimethylolpropane weighing 2194 parts was concentrated under vacuum to 970 parts. Two hundred fifty (250) parts of this concentrate was mixed with 750 parts of isopropanol and refluxed for one-half (½) hour. The sodium formate was removed in the manner described in Example I, and weighed 85 parts and assayed 98.0 per cent. The filtrate was dehydrated as described in Example I. No solids were deposited from the chilled dehydrated filtrate. The filtrate was evaporated to dryness and the crude trimethylolpropane obtained weighed 83 parts and contained 3.8 per cent sodium formate.

*Example III.*—The reaction liquor from a charge of trimethylolpropane made by condensing 1 mol of n-butyraldehyde with 3½ mols of 30% formaldehyde and ¾ mol of lime, and weighing 1881 parts, was concentrated under vacuum to 961.4 parts. Two hundred fifty (250) parts of this concentrate were mixed with 750 parts of isopropanol and refluxed for one-half (½) hour. The calcium formate which was removed weighed 82 parts and assayed 96.8 per cent. The filtrate was dehydrated in the way described in Example I. Upon cooling, 2.4 parts of solids were removed which were essentially pure calcium formate. Upon evaporation of the filtrate there was obtained 122 parts of crude trimethylolpropane having a hydroxyl content of 32.3% and containing 0.8% calcium formate.

It should be understood that this process can be used successfully for the recovery of condensation products of formaldehyde and other aldehydes and ketones in general; for example, formaldehyde-acetone, formaldehyde-valeraldehyde (trimethylolbutane), formaldehyde-hexaldehyde (trimethylolpentane), etc., as well as syrupy byproducts of all this type of condensation.

Having thus described our invention, what we claim as new and desire to secure by Letters Patent is:

1. A process for the recovery of a polymethylolalkane from a reaction liquor obtained from the condensation of formaldehyde and an aliphatic aldehyde having a greater number of carbon atoms in the molecule than acetaldehyde in the presence of an alkaline condensing agent, which liquor contains substantially all the metal formate and polymethylolalkane formed in the reaction, which comprises concentrating said liquor to a high solids content, diluting and heating the resulting concentrated product with such a quantity of a water-soluble monohydric aliphatic alcohol selected from the group consisting of ethanol, n-propanol and isopropanol that a substantial portion of the polymethylolalkane is dissolved and a substantial portion of the metal formate is not dissolved, separating the undissolved metal formate from the hot solution by filtration, and subsequently recovering the polymethylolalkane therefrom.

2. A process for the recovery of trimethylolethane from a reaction liquor obtained from the condensation of formaldehyde and propionaldehyde in the presence of an alkaline condensing agent, which liquor contains substantially all the metal formate and trimethylolethane formed in the reaction, which comprises concentrating said liquor to a high solids content, diluting and heating the resulting concentrated product with such a quantity of a water-soluble monohydric aliphatic alcohol selected from the group consisting of ethanol, n-propanol and isopropanol that a substantial portion of the trimethylolethane is dissolved and a substantial portion of the metal formate is not dissolved, separating the undissolved metal formate from the hot solution by filtration, and subsequently recovering the polymethylolethane therefrom.

3. A process for the recovery of trimethylolpropane from a reaction liquor obtained from the condensation of formaldehyde and n-butyraldehyde in the presence of an alkaline condensing agent, which liquor contains substantially all the metal formate and trimethylolpropane formed in the reaction, which comprises concentrating said liquor to a high solids content, diluting and heating the resulting concentrated product with such a quantity of a water-soluble monohydric aliphatic alcohol selected from the group consisting of ethanol, n-propanol and isopropanol that a substantial portion of the trimethylolpropane is dissolved and a substantial portion of the metal formate is not dissolved, separating the undissolved metal formate from the hot solution by filtration, and subsequently recovering the trimethylolpropane therefrom.

4. A process for the recovery of trimethylolethane from a reaction liquor obtained from the condensation of formaldehyde and propionaldehyde in the presence of an alkaline condensing agent, which liquor contains substantially all the metal formate and trimethylolethane formed in the reaction, which comprises concentrating said liquor to a high solids content, diluting and heating the resulting concentrated product with such a quantity of a water-soluble monohydric aliphatic alcohol selected from the group consisting of ethanol, n-propanol and isopropanol that a substantial portion of the trimethylolethane is dissolved and a substantial portion of the metal formate is not dissolved, separating the undissolved metal formate from the hot solution by filtration, thereafter adding to the solution an aromatic hydrocarbon selected from the group consisting of benzene and toluene which forms a ternary azeotropic mixture with the alcohol and water and removing the major portion of the residual water from the resulting solution by distillation as such ternary azeotrope, allowing the dehydrated solution to cool and removing the crystallized trimethylolethane therefrom, and subsequently recovering the residual amounts of trimethylolethane in the solution by evaporation.

5. A process for the recovery of trimethylolethane from a reaction mixture obtained from the condensation of formaldehyde and propionaldehyde in the presence of sodium hydroxide, which liquor contains substantially all the sodium formate and trimethylolethane formed in the reaction, which comprises concentrating said liquor to a solids content of approximately 90%, diluting and heating the resulting concentrated product with from approximately 1 to approximately 6 times its weight of a water-soluble monohydric aliphatic alcohol selected from the group consisting of ethanol, n-propanol and isopropanol, separating the undissolved sodium formate from the hot solution by filtration, thereafter adding to the solution an aromatic hydrocarbon selected from the group consisting of benzene and toluene which forms a ternary azeotropic mixture with the alcohol and water and removing the major proportion of the residual water from the resulting solution by distillation as such ternary azeotrope, allowing the dehydrated solution to cool and removing the crystallized trimethylolethane therefrom, and subsequently recovering the residual amounts of trimethylolethane in the solution by evaporation.

6. A process for the recovery of trimethylolpropane from a reaction mixture obtained from the condensation of formaldehyde and n-butyraldehyde in the presence of sodium hydroxide, which liquor contains substantially all the sodium formate and trimethylolpropane formed in the reaction, which comprises concentrating said liquor to a solids content of approximately 90%, diluting and heating the resulting concentrated product with from approximately 1 to approximately 6 times its weight of a water-soluble monohydric aliphatic alcohol selected from the group consisting of ethanol, n-propanol and isopropanol, separating the undissolved sodium formate from the solution by filtration, and subsequently evaporating the solution to recover the trimethylolpropane therefrom.

7. A process for the recovery of trimethylolpropane from a reaction liquor obtained from the condensation of formaldehyde and n-butyraldehyde in the presence of an alkaline condensing agent, which liquor contains substantially all the metal formate and trimethylolpropane formed in the reaction, which comprises concentrating said liquor to a solids content of approximately 90%, diluting and heating the resulting concentrated product with from approximately 1 to approximately 6 times its weight of isopropanol, separating the undissolved metal formate from the hot solution by filtration, thereafter adding benzene to the solution and removing the major portion of the residual water from the resulting solution by distillation as a ternary water-isopropanol-benzene azeotrope, allowing the solution to cool and removing the crystallized trimethylolpropane therefrom.

HERMAN A. POITRAS.
JOHN E. SNOW.
SYLVIO A. DE LORENZO.

REFERENCES CITED

The following references are of record in the file of this patent:

UNITED STATES PATENTS

| Number | Name | Date |
|---|---|---|
| 2,135,063 | Walker et al. | Nov. 1, 1938 |
| 2,270,839 | Wyler | Jan. 20, 1942 |

OTHER REFERENCES

Ebert, "Ber. der Deut. Chem. Gessell.," vol. 64B, pp. 114–9, 1931. (Copy in Patent Office Scientific Library.)